(12) United States Patent
Williams et al.

(10) Patent No.: US 11,789,776 B2
(45) Date of Patent: Oct. 17, 2023

(54) SYSTEM AND METHOD FOR MINIMIZING COMPUTATIONAL PROCESSING FOR CONVERTING USER RESOURCES TO RESOURCES SUPPORTED BY THIRD PARTY ENTITIES

(71) Applicant: BANK OF AMERICA CORPORATION, Charlotte, NC (US)

(72) Inventors: Matthew Edward Williams, Frisco, TX (US); Nicholas Ralph Jope, Gilbert, AZ (US); Paul Martin Mattison, Sherrills Ford, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 247 days.

(21) Appl. No.: 17/352,980

(22) Filed: Jun. 21, 2021

(65) Prior Publication Data
US 2022/0405136 A1 Dec. 22, 2022

(51) Int. Cl.
*G06Q 20/10* (2012.01)
*G06F 9/50* (2006.01)
*G06K 7/14* (2006.01)

(52) U.S. Cl.
CPC ......... *G06F 9/5005* (2013.01); *G06K 7/1404* (2013.01); *G06Q 20/1085* (2013.01)

(58) Field of Classification Search
CPC ............... G06F 9/5005; G06K 7/1404; G06Q 20/1085; G06Q 20/20; G06Q 20/326; G06Q 20/381; G06Q 20/3276
See application file for complete search history.

(56) References Cited

U.S. PATENT DOCUMENTS 7,841,524 B2 * 11/2010 Schmidt ............. G06K 7/10623
235/462.14
8,630,907 B2    1/2014 Mardikar et al.
(Continued)

FOREIGN PATENT DOCUMENTS

CN    106846666    *  6/2017   ............. G07F 19/00
CN    106846666 A  *  6/2017   ............. G07F 19/00
(Continued)

OTHER PUBLICATIONS

TravelDealz: Rip-off: Dynamic Currency Conversion for Cash Withdrawals, Aug. 6, 2019, pp. 1-9 (Year: 2019).*
(Continued)

*Primary Examiner* — Bijendra K Shrestha
(74) *Attorney, Agent, or Firm* — Moore & Van Allen PLLC; Nicholas C. Russell

(57) ABSTRACT

Embodiments of the present invention provide a system for minimizing computational processing for converting user resources to resources supported by third party entities. In particular, the system may be configured to determine that a user has scanned a code projected on an entity device via a third party application present on a user device of the user, wherein the entity device is associated with an entity, establish a first connection with the entity device, establish a second connection between the user device and the entity device based on determining that the user has scanned the code, determine that the user has inserted user resources into the entity device, via the first connection, convert the user resources to resources supported by a third party entity, and display in real-time, information associated with the resources on the third party application.

17 Claims, 5 Drawing Sheets

(56) References Cited

U.S. PATENT DOCUMENTS

| | | | |
|---|---|---|---|
| 8,924,712 | B2 | 12/2014 | Varadarajan et al. |
| 8,972,297 | B2 | 3/2015 | Kay et al. |
| 9,690,968 | B2 | 6/2017 | Wadley |
| 9,916,736 | B2 | 3/2018 | Block et al. |
| 10,181,123 | B2* | 1/2019 | Scipioni ............... G06Q 20/20 |
| 10,475,009 | B2 | 11/2019 | Recriwal et al. |
| 10,614,442 | B2 | 4/2020 | Gupta et al. |
| 10,789,580 | B2 | 9/2020 | Wolfs et al. |
| 11,074,562 | B1 | 7/2021 | Phillips |
| 11,282,053 | B1* | 3/2022 | Dennis ............... G06Q 20/102 |
| 11,475,421 | B2 | 10/2022 | Phillips et al. |
| 11,507,932 | B2 | 11/2022 | Phillips et al. |
| 2003/0195859 | A1 | 10/2003 | Lawrence |
| 2004/0267663 | A1* | 12/2004 | Karns .................... G06Q 20/10 705/40 |
| 2011/0016047 | A1 | 1/2011 | Wu et al. |
| 2011/0238573 | A1 | 9/2011 | Varadarajan |
| 2012/0047070 | A1 | 2/2012 | Pharris |
| 2012/0173351 | A1* | 7/2012 | Hanson ............... G06Q 30/0635 705/26.81 |
| 2015/0058216 | A1* | 2/2015 | Luciani ............... G06Q 20/3276 705/43 |
| 2016/0019510 | A1 | 1/2016 | Guntupalli |
| 2017/0243184 | A1* | 8/2017 | Bondesen .......... G06Q 20/4012 |
| 2018/0075438 | A1 | 3/2018 | Iqbal et al. |
| 2019/0073663 | A1 | 3/2019 | Jamkhedkar et al. |
| 2019/0139033 | A1* | 5/2019 | Ricotta ............. G06Q 20/1085 |
| 2020/0311364 | A1 | 10/2020 | Mcgavock, Jr. et al. |
| 2021/0118052 | A1* | 4/2021 | Walser .................. G06Q 20/36 |
| 2023/0011788 | A1* | 1/2023 | Wong ............... G06Q 20/40145 |

FOREIGN PATENT DOCUMENTS

| | | | | |
|---|---|---|---|---|
| EP | 3812991 A1 * | 4/2021 | ............. | G06F 9/547 |
| WO | WO-2018111858 A1 * | 6/2018 | ............. | G06F 21/44 |

OTHER PUBLICATIONS

DBS Bank Ltd .: Domestic Multi-Currency Notional Pooling—Managing cross-currency liquidity with ease, 2017, pp. 1-3 (Year: 2017).*

The Telegraph: What is the cheapest way to send money abroad, Apr. 27, 2021, pp. 1-10 (Year: 2021).*

* cited by examiner

SYSTEM AND METHOD FOR MINIMIZING COMPUTATIONAL PROCESSING FOR CONVERTING USER RESOURCES TO RESOURCES SUPPORTED BY THIRD PARTY ENTITIES

BACKGROUND

There exists a need for a system to minimize computational processing associated with converting user resources to resources supported by third party entities.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for minimizing computational processing for converting user resources to resources supported by third party entities. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user has scanned a code projected on an entity device via a third party application present on a user device of the user, wherein the entity device is associated with an entity, establishes a first connection with the entity device, establishes a second connection between the user device and the entity device based on determining that the user has scanned the code, determines that the user has inserted user resources into the entity device, via the first connection, converts the user resources to resources supported by a third party entity, and displays in real-time, information associated with the resources on the third party application.

In some embodiments, the present invention determines that the user has scanned the code based on receiving an indication from the third party application.

In some embodiments, the present invention integrates one or more functionalities into the third party application provided by the third party entity, wherein the one or more functionalities communicate the indication upon receiving the code.

In some embodiments, the present invention authenticates the user based on determining that the user has scanned the code.

In some embodiments, the present invention in response to converting the user resources to the resources supported by the third party entity, initiates a real-time transfer from an entity resource pool associated with the entity to a third party resource pool associated with the third party entity.

In some embodiments, the user is a customer of the entity.

In some embodiments, the user is not a customer of the entity.

In some embodiments, the third party entity is customer of the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
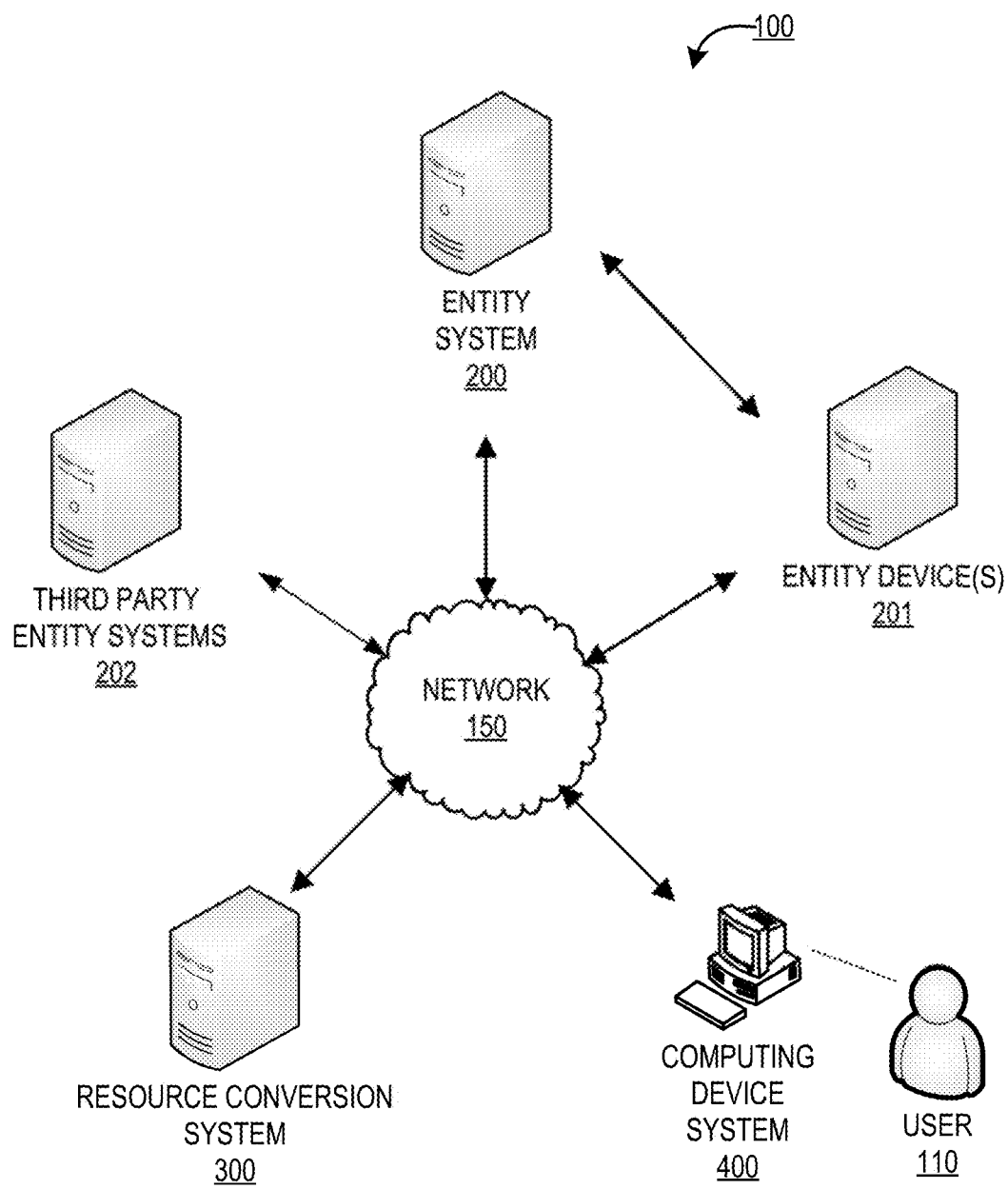
Figure 2:
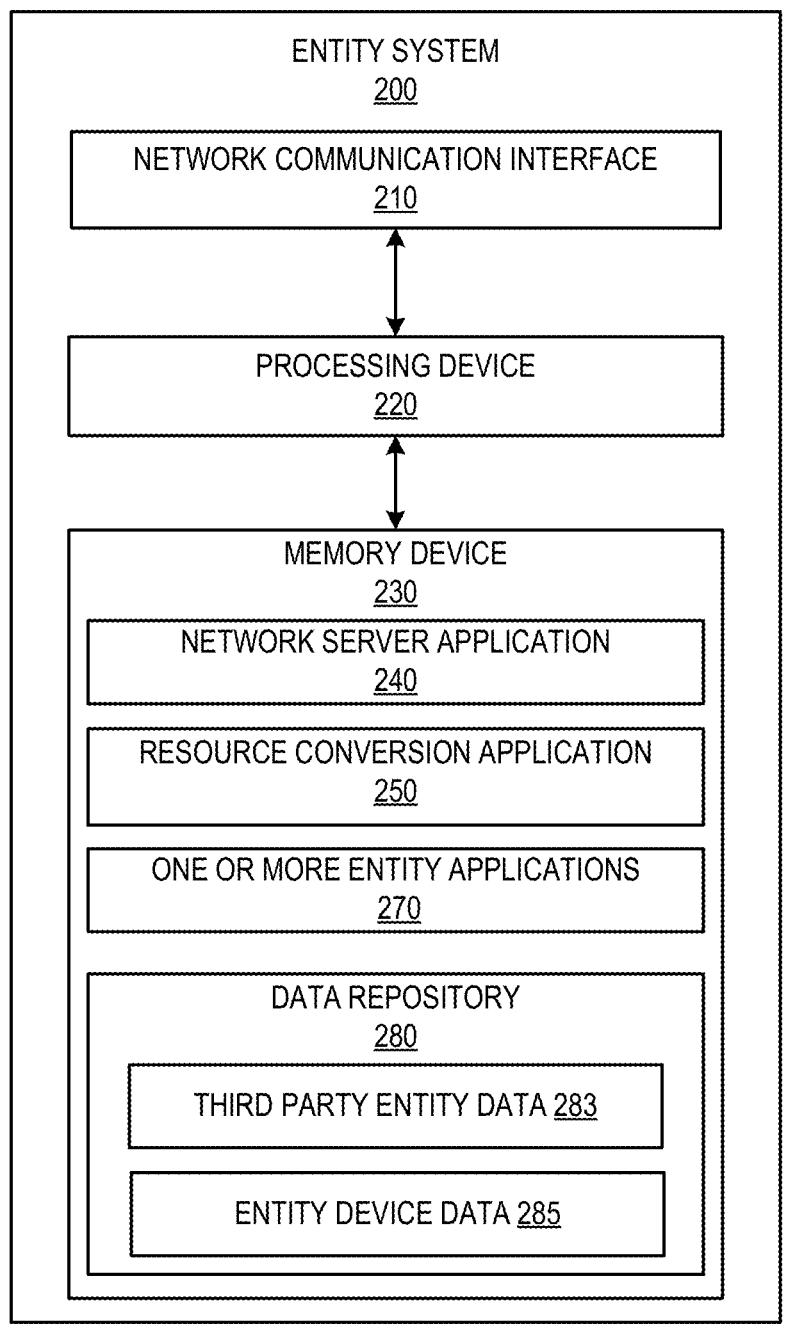
Figure 3:
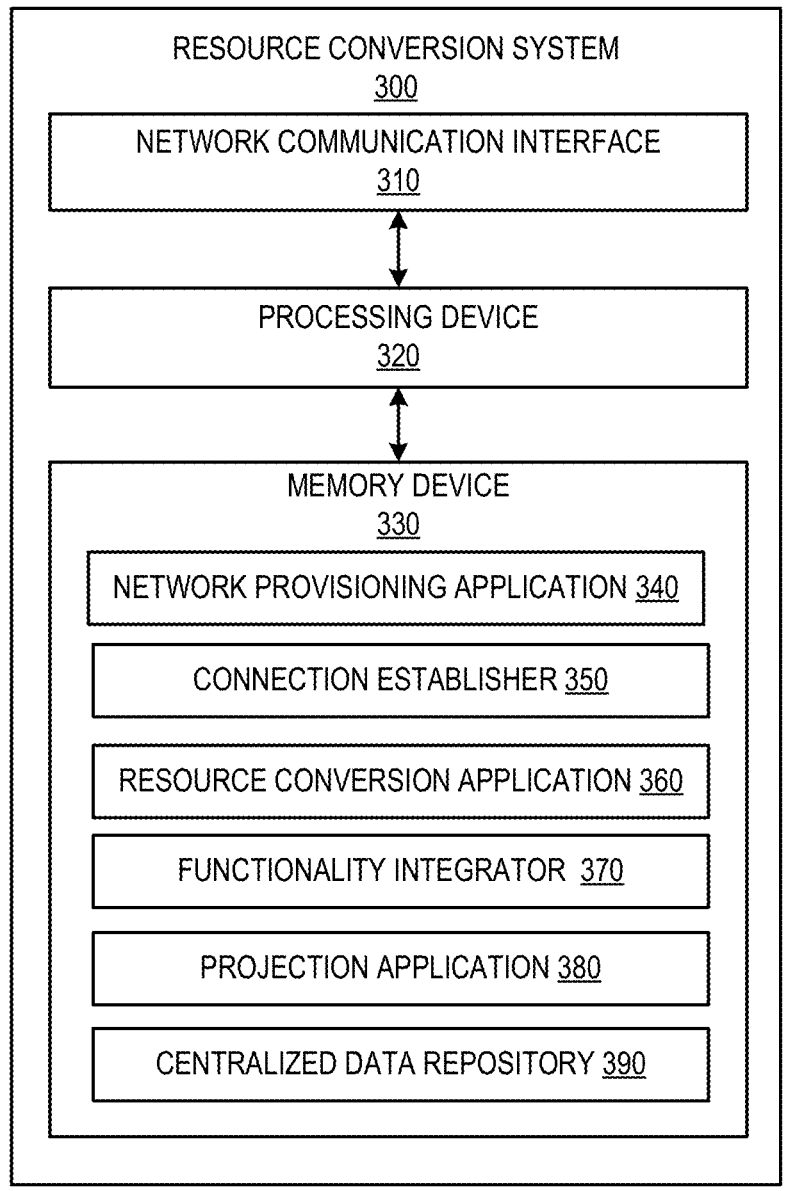
Figure 4:
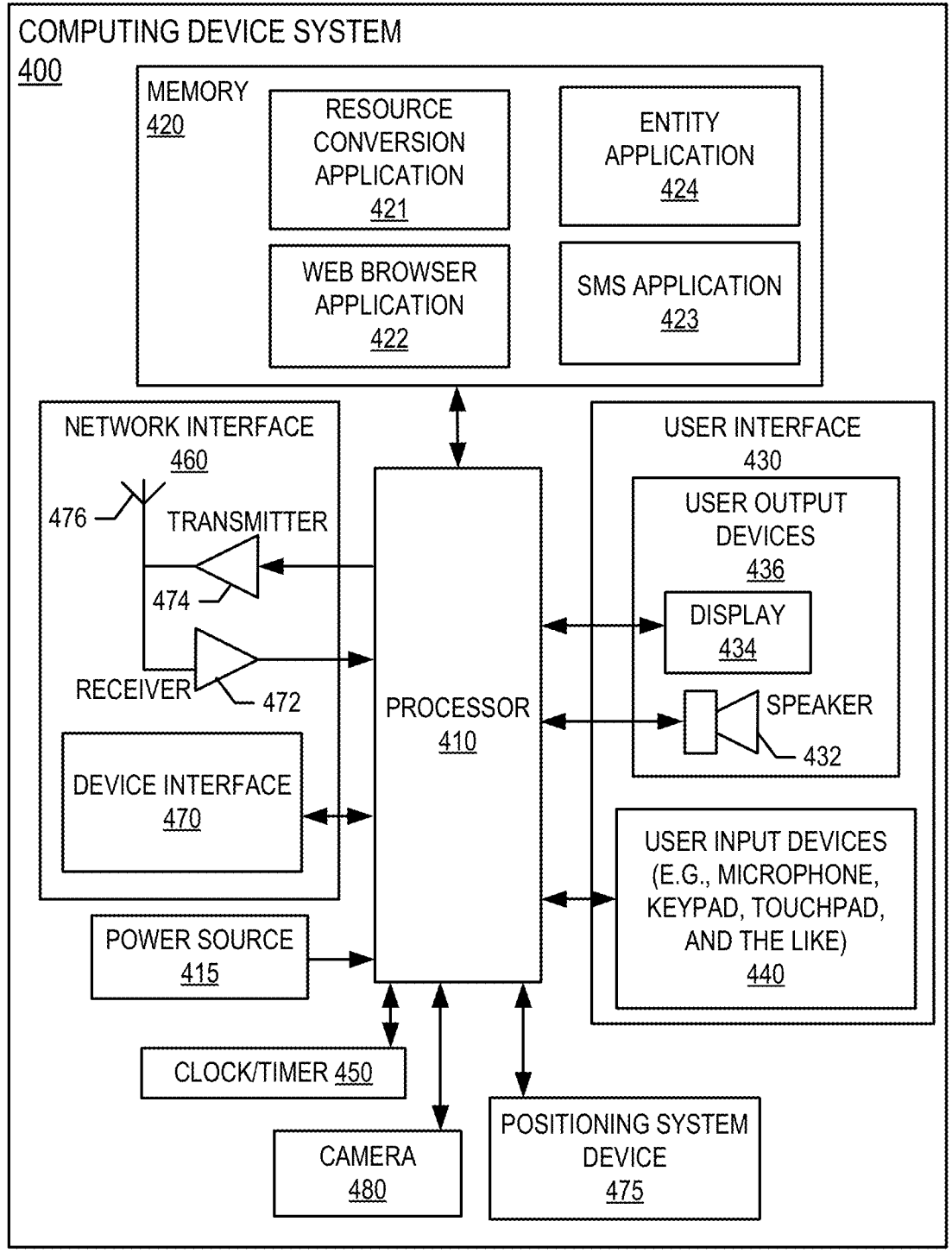
Figure 5:
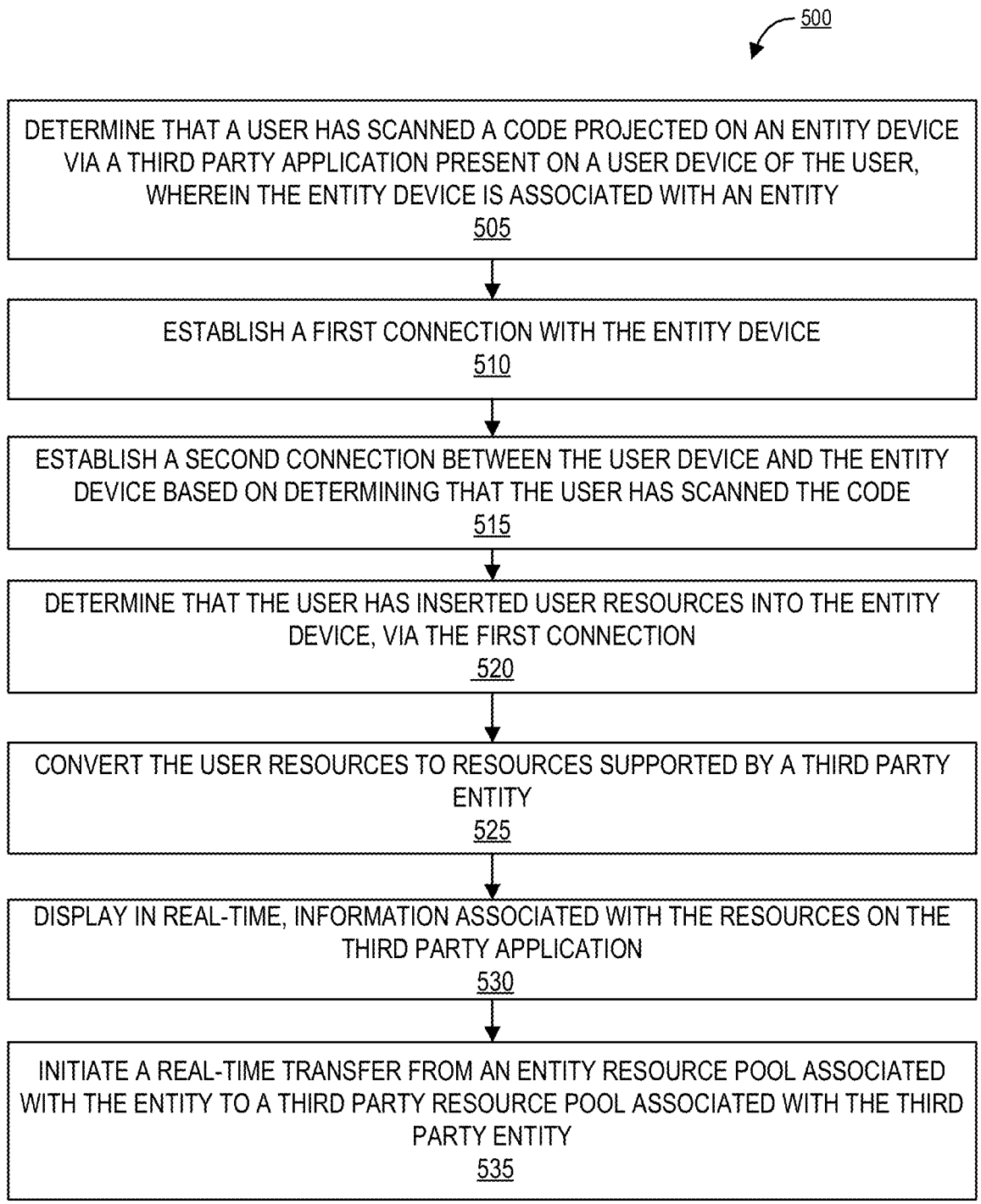

Having thus described embodiments of the invention in general terms, reference will now be made the accompanying drawings, wherein:

FIG. 1 provides a block diagram illustrating a system environment for minimizing computational processing for converting user resources to resources supported by third party entities, in accordance with an embodiment of the invention;

FIG. 2 provides a block diagram illustrating the entity system 200 of FIG. 1, in accordance with an embodiment of the invention;

FIG. 3 provides a block diagram illustrating a resource conversion system 300 of FIG. 1, in accordance with an embodiment of the invention;

FIG. 4 provides a block diagram illustrating the computing device system 400 of FIG. 1, in accordance with an embodiment of the invention; and FIG. 5 provides a block diagram illustrating a process flow for minimizing computational processing for converting user resources to resources supported by third party entities, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity. In some embodiments of the present invention, the entity device may be an automated machine. In some embodiments, the "automated machine" may be any automated device that is involved in distribution of resources such as cash, checks, electronic transfers, money orders or the like which may be performed using a credit card, a debit card, a digital wallet, or the like. In one embodiment of the present invention, the automated machine may be an Automated Teller Machine (ATM). In some embodiments, the "automated machine" may be any automated device that provides information associated with resource pools of the user. In some embodiments, the automated machine may be owned and/or controlled by the resource entity.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution. In some embodiments, the "user" may not be a customer of the entity. In some embodiments, the "user" may be a customer of a third party entity, where the third party entity may be a customer of the entity. As described herein, a "third party entity" may be any organization such as, but not limited to, convenient stores, retail stores, other financial organizations (e.g., international remittance organization, online payment organization, or the like), and/or the like that may seek financial services from the entity.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, third party entities typically provide services, goods, and/or products to one or more users for which the one or more users may initiate payments using a credit card, debit card, a gift card, or the like. However, all these transactions have to be processed via different payment rails (e.g., credit card networks) for the resources to be delivered from financial institution associated with an account of the user to receiving financial institutions associated with the third party entities, where the processing typically takes a few days to complete and consumes a lot of computing and processing power of one or more systems associated with different payment rails involved. As such, there exists a need for system that minimize the processing time and computational processing power to convert user resources to resources supported by third party entities. The system of the present invention resolves the above technical problems by minimizing the computational processing and the processing time associated with converting user resources to resources supported by third party entities.

FIG. 1 provides a block diagram illustrating a system environment 100 for minimizing computational processing for converting user resources to resources supported by third party entities, in accordance with an embodiment of the invention. As illustrated in FIG. 1, the environment 100 includes a resource conversion system 300, entity system 200, one or more entity devices 201, one or more third party entity systems 202, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more user(s) 110 may not be customers of the entity associated with the entity system. In such embodiments, the one or more user(s) 110 may customers of one or more third parties associated with the one or more third party entity systems 202. In some embodiments, the one or more third party entities associated with the third party entity systems 202 may be customers of the entity associated with the entity system 200. In some embodiments, the one or more third party entities may not be customers of the entity, but a customer of any other entity that is part of a peer-to-peer network associated with the entity.

The entity system(s) 200 may be any system owned or otherwise controlled by an entity to support or perform one or more process steps described herein. In some embodiments, the entity is a financial institution. In some embodiments, the one or more entity devices 201 may be owned, operated, controlled, and/or maintained by the entity. Examples of the one or more entity devices may include, but are not limited to, Automated Teller Machines, automated kiosks, associate computing devices (e.g., computing device used by an employee of the entity), or the like that allow a user and/or an associate to access information associated with one or more resource pools of the user or to perform one or more resource interactions associated with the one or more resource pools of the user. The one or more third party entity systems 202 may be associated with the third party entities that may be a customer of the entity, where the entity systems associated with the entity provide one or more financial related services to the one or more third party entities.

The resource conversion system 300 is a system of the present invention for performing one or more process steps described herein. In some embodiments, the resource conversion system 300 may be an independent system. In some embodiments, the resource conversion system 300 may be a part of the entity system 200.

The resource conversion system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource conversion system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the resource conversion system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a resource conversion application 250, one or more entity applications 270, and a data repository 280 comprising third party entity data 283 and entity device data 285, where the third party entity data 283 comprises data associated with the one or more third party entities and/or one or more resource pools associated with the third party entities and the entity device data 285 comprises data associated with one or more entity devices. In addition to the third party entity data 283 and the entity device data, the system may comprise user data associated with the one or more users 110. The one or more entity applications 270 may be any applications provided by the entity that allows users 110 to access information and/or perform one or more actions associated with one or more resource pools of the users 110. The computer-executable program code of the network server application 240, the resource conversion application 250, the one or more entity application 270 to perform certain logic, data-extraction, and data-storing functions of the entity system 200 described herein, as well as communication functions of the entity system 200.

The network server application 240, the resource conversion application 250, and the one or more entity applications 270 are configured to store data in the data repository 280 or to use the data stored in the data repository 280 when communicating through the network communication interface 210 with the resource conversion system 300, and/or the computing device system 400 to perform one or more process steps described herein. In some embodiments, the entity system 200 may receive instructions from the resource conversion system 300 via the resource conversion application 250 to perform certain operations. The resource conversion application 250 may be provided by the resource conversion system 300.

FIG. 3 provides a block diagram illustrating the resource conversion system 300 in greater detail, in accordance with embodiments of the invention. As illustrated in FIG. 3, in one embodiment of the invention, the resource conversion system 300 includes one or more processing devices 320 operatively coupled to a network communication interface 310 and a memory device 330. In certain embodiments, the resource conversion system 300 is operated by a first entity, such as a financial institution. In some embodiments, the resource conversion system 300 is owned or operated by the entity of the entity system 200. In some embodiments, the resource conversion system 300 may be an independent system. In alternate embodiments, the resource conversion system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource conversion system 300 described herein. For example, in one embodiment of the resource conversion system 300, the memory device 330 includes, but is not limited to, a network provisioning application 340, a connection establisher 350, a resource conversion application 360, a functionality integrator 370, a projection application 380, and a centralized data repository 390 comprising data processed or accessed by one or more applications in the memory device 330. The computer-executable program code of the network provisioning application 340, the connection establisher 350, the resource conversion application 360, the functionality integrator 370, and the projection application 380 may instruct the processing device 320 to perform certain logic, data-processing, and data-storing functions of the resource conversion system 300 described herein, as well as communication functions of the resource conversion system 300.

The network provisioning application 340, the connection establisher 350, the resource conversion application 360, the functionality integrator 370, and the projection application 380 are configured to invoke or use the data in the data repository 390 when communicating through the network communication interface 310 with the entity system 200, and/or the computing device system 400. In some embodiments, the network provisioning application 340, the connection establisher 350, the resource conversion application 360, the functionality integrator 370, and the projection application 380 may store the data extracted or received from the entity system 200, and the computing device system 400 in the centralized data repository 390. In some embodiments, the network provisioning application 340, the connection establisher 350, the resource conversion application 360, the functionality integrator 370, and the projection application 380 may be a part of a single application. The functionalities of the network provisioning application 340, the connection establisher 350, the resource conversion application 360, the functionality integrator 370, and the projection application 380 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource conversion application 421, entity application 424, an SMS application 423, or the like. In some embodiments, the entity application 424 may be an online banking application. The resource conversion application 421 may comprise instructions to a graphical user interface (GUI) on the display 430 that allows the user 110 to interact with the entity system 200, the resource conversion system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource conversion application 421 provided by the resource conversion system 300 allows the user 110 to access the resource conversion system 300. In some embodiments, the entity application 424 provided by the entity system 200 and the resource conversion application 421 allow the user 110 to access the functionalities provided by the resource conversion system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating a process flow 500 for minimizing computational processing for converting user resources to resources supported by third party entities, in accordance with an embodiment of the invention.

As shown in block 505, the system determines that a user has scanned a code projected on an entity device via a third party application present on a user device of the user, wherein the entity device is associated with an entity. The system may determine that the user has scanned the code via the third party application based on receiving an indication from the third party entity application. The system may generate and integrate one or more functionalities into the third party application provided by the third party entity. The one or more functionalities in the third party application provide the indication when the user scans the code project on the entity device, via the third party entity application. In response to receiving the indication, the system may communicate with the third party entity system and/or entity system and may authenticate the user.

In some embodiments, the code may be a bar code, QR code, or any other scannable code that is projected on a display screen of the entity device. In some embodiments, the system of the present invention may transmit controls signals to the one or more entity devices to display a scannable code on each of the one or more entity devices. In some embodiments, the system of the present invention may communicate with the entity system of the entity to project scannable code on the one or more entity devices.

As shown in block 510, the system establishes a first connection with the entity device. The system communicates with the entity device and establishes the first connection via the network provisioning application As shown in block 515, the system establishes a second connection between the user device and the entity device based on determining that the user has scanned the code.

As shown in block 520, the system determines that the user has inserted user resources into the entity device, via the first connection. The user resources may be physical resources such as cash. As shown in block 525, the system converts the user resources to resources supported by a third party entity. In some embodiments, the system may convert the physical resources to digital resources that are supported by the third party entities. For example, the system may convert cash into retail cash/tokens that are accepted by the third party entities as a form of payment.

As shown in block 530, the system displays in real-time, information associated with the resources on the third party application. In some embodiments, the system may display the information in real-time based on the second connection established by the system, where the system may transmit control signals to cause the entity device to project information associated with the resources on the third party application. For example, the system may display a message on the user device that $X have been successfully funded to a retail account. In some embodiments, the system may communicate with the third party entity system and invoke the one or more functionalities to update the resource balance on the third party entity application on the user device in real-time, where the resource balance is linked with a retail account created by the user via the third party entity application and the resource balance is indicative of at least the user resources that were inserted into the entity device by the user.

As shown in block 535, the system initiates a real-time transfer from an entity resource pool associated with the entity to a third party resource pool associated with the third party entity. The transfer initiated by the system is processed instantaneously without having to go through external payment rails such as credit card networks, thereby reducing the computational processing and processing time associated with the transfer. For example, if the third party entity is a customer of the entity, the system may directly transfer funds into an account of the third party entity without having to go through any payment network. In some embodiments, the system may user a peer-to-peer network to transfer the resources, where the transfer of resources is instantaneous. For example, if the third party entity is not a customer of the entity, but a customer of other entity that is part of the peer-to-peer network associated with the entity, the system initiates the transfer via the peer-to-peer network. In some particular embodiments, the system may transfer the resources via an Automated Clearing House (ACH) network when necessary. The system of the present invention also allows small third party entities to deposit resources directly into one or more entity devices instead of having to go through another third party to handle daily resources (e.g., cash).

In an exemplary embodiment, the system may allow users to deposit resources and convert the resources into a foreign currency via the process explained in FIG. 5, where the foreign currency is deposited into an foreign resource pool of the user. The system may communicate with a foreign remittance entity to convert the resources into foreign currency and deposit foreign currency into the foreign resource pool (e.g., foreign remittance account) of the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for minimizing computational processing for converting user resources to resources supported by third party entities, the system comprising:
    a memory device with computer-readable program code stored thereon;
    a communication device; and
    a processing device operatively coupled to the memory device and the communication device, wherein the processing device is configured to execute the computer-readable program code to:
        determine that a user has scanned a code projected on an entity device via a third party application present on a user device of the user, wherein the entity device is associated with an entity;
        establish a first connection with the entity device based on the user inserting user resources into the entity device, wherein user resources includes physical currency;
        establish a second connection between the user device and the entity device based on determining that the user has scanned the code;
        determine that the user has inserted user resources into the entity device, via the first connection;
        convert the user resources to resources supported by a third party entity, wherein converting the user resources to resources supported by the third party entity further comprises converting the physical currency to tokens accepted by the third party entity;
        display in real-time, information associated with the resources on the third party application, based on the second connection established between the user device and the entity device transmitting control signals causing the entity device projecting the information associated with the resources on the third party application; and
        in response to converting the user resources to the resources supported by the third party entity, initiate a real-time transfer from an entity resource pool associated with the entity to a third party resource pool associated with the third party entity.

2. The system according to claim 1, wherein the processing device is further configured to execute the computer-readable program code to determine that the user has scanned the code based on receiving an indication from the third party application.

3. The system according to claim 2, wherein the processing device is further configured to execute the computer-readable program code to integrate one or more functionalities into the third party application provided by the third party entity, wherein the one or more functionalities communicate the indication upon receiving the code.

4. The system according to claim 1, wherein the processing device is further configured to execute the computer-readable program code to authenticate the user based on determining that the user has scanned the code.

5. The system of claim 1, wherein the user is a customer of the entity.

6. The system of claim 1, wherein the user is not a customer of the entity.

7. The system according to claim 1, wherein the third party entity is customer of the entity.

8. A computer program product for minimizing computational processing for converting user resources to resources supported by third party entities, the computer program product comprising at least one non-transitory computer readable medium having computer-readable program code portions embodied therein, the computer-readable program code portions comprising executable portions for:
   determining that a user has scanned a code projected on an entity device via a third party application present on a user device of the user, wherein the entity device is associated with an entity;
   establishing a first connection with the entity device based on the user inserting user resources into the entity device, wherein user resources includes physical currency;
   establishing a second connection between the user device and the entity device based on determining that the user has scanned the code;
   determining that the user has inserted user resources into the entity device, via the first connection;
   converting the user resources to resources supported by a third party entity, wherein converting the user resources to resources supported by the third party entity further comprises converting the physical currency to tokens accepted by the third party entity; and
   displaying in real-time, information associated with the resources on the third party application, based on the second connection established between the user device and the entity device transmitting control signals causing the entity device projecting the information associated with the resources on the third party application and
   in response to converting the user resources to the resources supported by the third party entity, initiating a real-time transfer from an entity resource pool associated with the entity to a third party resource pool associated with the third party entity.

9. The computer program product of claim 8, wherein the computer-readable program code portions comprising executable portions for determining that the user has scanned the code based on receiving an indication from the third party application.

10. The computer program product of claim 9, wherein the computer-readable program code portions comprising executable portions for integrating one or more functionalities into the third party application provided by the third party entity, wherein the one or more functionalities communicate the indication upon receiving the code.

11. The computer program product of claim 8, wherein the computer-readable program code portions comprising executable portions for authenticating the user based on determining that the user has scanned the code.

12. A computer-implemented method for minimizing computational processing for converting user resources to resources supported by third party entities, the method comprising:
   determining that a user has scanned a code projected on an entity device via a third party application present on a user device of the user, wherein the entity device is associated with an entity;
   establishing a first connection with the entity device based on the user inserting user resources into the entity device, wherein user resources includes physical currency;
   establishing a second connection between the user device and the entity device based on determining that the user has scanned the code;
   determining that the user has inserted user resources into the entity device, via the first connection;
   converting the user resources to resources supported by a third party entity, wherein converting the user resources to resources supported by the third party entity further comprises converting the physical currency to tokens accepted by the third party entity; and
   displaying in real-time, information associated with the resources on the third party application, based on the second connection established between the user device and the entity device transmitting control signals causing the entity device projecting the information associated with the resources on the third party application; and
   in response to converting the user resources to the resources supported by the third party entity, initiating a real-time transfer from an entity resource pool associated with the entity to a third party resource pool associated with the third party entity.

13. The computer-implemented method of claim 12, wherein the method further comprises determining that the user has scanned the code based on receiving an indication from the third party application.

14. The computer-implemented method of claim 13, wherein the method further Comprises integrating one or more functionalities into the third party application provided by the third party entity, wherein the one or more functionalities communicate the indication upon receiving the code.

15. The computer-implemented method of claim 12, wherein the user is a customer of the entity.

16. The computer-implemented method of claim 12, wherein the user is not a customer of the entity.

17. The computer-implemented method of claim 12, wherein the third party entity is customer of the entity.

* * * * *